United States Patent [19]

Lampe

[11] Patent Number: 5,062,065
[45] Date of Patent: Oct. 29, 1991

[54] ENVIRONMENTAL SENSING AND VENTILATION CONTROL SYSTEM WITH COMPENSATION FOR SENSOR CHARACTERISTICS

[75] Inventor: Wolfgang Lampe, Neuenrade, Fed. Rep. of Germany

[73] Assignee: Leopold Kostal GmbH & Co., KG, Ludenscheid, Fed. Rep. of Germany

[21] Appl. No.: 418,121

[22] Filed: Oct. 6, 1989

[51] Int. Cl.$^5$ .................. G06F 15/20; G01D 21/00
[52] U.S. Cl. .................. 364/571.04; 73/23.21; 98/2.01; 364/571.01; 364/571.03
[58] Field of Search .................. 98/2, 2.01, 2.11; 236/44 E, 49.2, 49.3; 237/5, 12.3 A, 12.3 R, 12.4, 12.5, 12.6; 73/23.21; 364/571.01–571.08, 506, 550, 424.05

[56] References Cited

U.S. PATENT DOCUMENTS

| | | | |
|---|---|---|---|
| 4,258,563 | 3/1981 | Yasuda et al. | 73/23.21 |
| 4,259,722 | 3/1981 | Iwata et al. | 364/424.05 |
| 4,443,791 | 4/1974 | Risgin et al. | 73/23.21 |
| 4,458,583 | 7/1984 | Fukui et al. | 98/2.01 |
| 4,519,237 | 5/1985 | Kubo | 73/23.21 |
| 4,581,988 | 4/1986 | Mattei | 98/2.01 |
| 4,669,052 | 5/1987 | Bianco | 364/571.04 |
| 4,733,605 | 3/1988 | Hölter et al. | 98/2.11 |
| 4,742,763 | 5/1988 | Hölter et al. | 98/2.01 |
| 4,812,997 | 3/1989 | Okochi et al. | 364/505 |
| 4,930,407 | 6/1990 | Hölter et al. | 98/2.01 |

FOREIGN PATENT DOCUMENTS 3304324 8/1984 Fed. Rep. of Germany ....... 98/2.01

OTHER PUBLICATIONS

Engineer's Notebook II; 1982; "Programmable Power Supply", Forrest Mims, III; pp. 72.

Primary Examiner—Kevin J. Teska
Attorney, Agent, or Firm—Brooks & Kushman

[57] ABSTRACT

An environmental sensing and ventilation control device is suggested, which is designed to control an electrically-driven system such as air intake flaps on an automotive vehicle. The sensor device includes a voltage divider with a sensor element. For the purpose of spatial separation of the means required for compensation of manufacturing deviations and the temperature sensitivity of the sensor element, as well as for provision of automatic compensation within the device, a microcomputer is connected on its input side to the divider point of the voltage divider via an analog/digital converter and on its output side with a number of switch elements. Each switch element co-operates with a different resistor so that at least one register connects the sensor element resistance to ground.

20 Claims, 6 Drawing Sheets

ENVIRONMENTAL SENSING AND VENTILATION CONTROL SYSTEM WITH COMPENSATION FOR SENSOR CHARACTERISTICS

DESCRIPTION

The present invention is based on a sensor device, which is intended to control electrically adjustable ventilation systems for ventilation of enclosed spaces depending on pollutant levels.

During operation of a motor vehicle, the problem generally arises that exhaust from other vehicles in the area can get into the vehicle interior via the ventilation system, causing the occupants to be subjected to odor nuisance or even health injuries.

In order to prevent this, a procedure is known for installing a sensor element at a suitable point on the vehicle to record the pollutant concentration, the sensor element being connected to electrically adjustable air flaps via an associated circuit configuration in such a way that, when pollutant peaks occur, the air flaps are immediately closed.

In such procedures, a semiconductor component (SnO2) is used as a sensor element for recording the pollutant concentration. The internal resistance of the semiconductor component changes with increasing pollutant concentration. However, such sensor elements are plagued with a series of problems. On the one hand, they are subject to a high degree of manufacturing quality deviation. On the other hand, changes in the base resistance occur with different temperatures as do changes in sensitivity with different humidity levels. Changes in the basic resistance and the sensitivity also occur over the service life of the sensor device.

In order to compensate for the manufacturing quality deviations and the temperature sensitivity, the procedure is known of attaching a resistor circuit with a PTC and/or NTC resistor exhibiting a characteristic corresponding to the temperature behavior of the sensor element, in the form of a voltage divider, whereby the sensor voltage picked up at the divider point is a measurement for the pollutant load of the air.

However, if such an NTC resistor is employed, it must be mounted in the vicinity of the sensor element because both components must be exposed to the same temperature conditions.

Furthermore, it has already been suggested that the operating point of the circuit also be controlled, whereby a portion, acquired by integration, of the sensor voltage picked up at the divider point can be added to a fixed voltage base value. The time constant of the integration element must be large enough in comparison to the sensitivity of the sensor voltage picked up at the divider point, so that the voltage peaks are not included in the determination of the operating point.

With a design of this type, all the problems previously mentioned with respect to the sensor element can be solved satisfactorily. However, the greater expense has to be considered, especially with regard to the compensation circuit configuration.

Therefore, the present invention is based on the task of creating a sensor device in which the means required for compensation of the manufacturing deviations and temperature sensitivity is mounted physically separated from the sensor element and automatic compensation is possible.

In the invention, the problem is solved by providing a microcomputer which controls an electrically operable assembly, such as air or ventilation flaps, in response to commands generated by the microcomputer as a function of signals generated by the sensor corresponding to the external pollutant levels and the different internal characteristics of the sensor. With a sensor device of this design, it is very advantageous that no pre-selection of the individual sensor elements or adaption and/or pre-selection of the components cooperating with it is required.

Additional design features of the invention will be explained in more detail using an implemented example represented in the drawing where the following are shown FIG. 1a is a circuit diagram of the environmental sensor control system without a multiplexer;

Figure 1A:
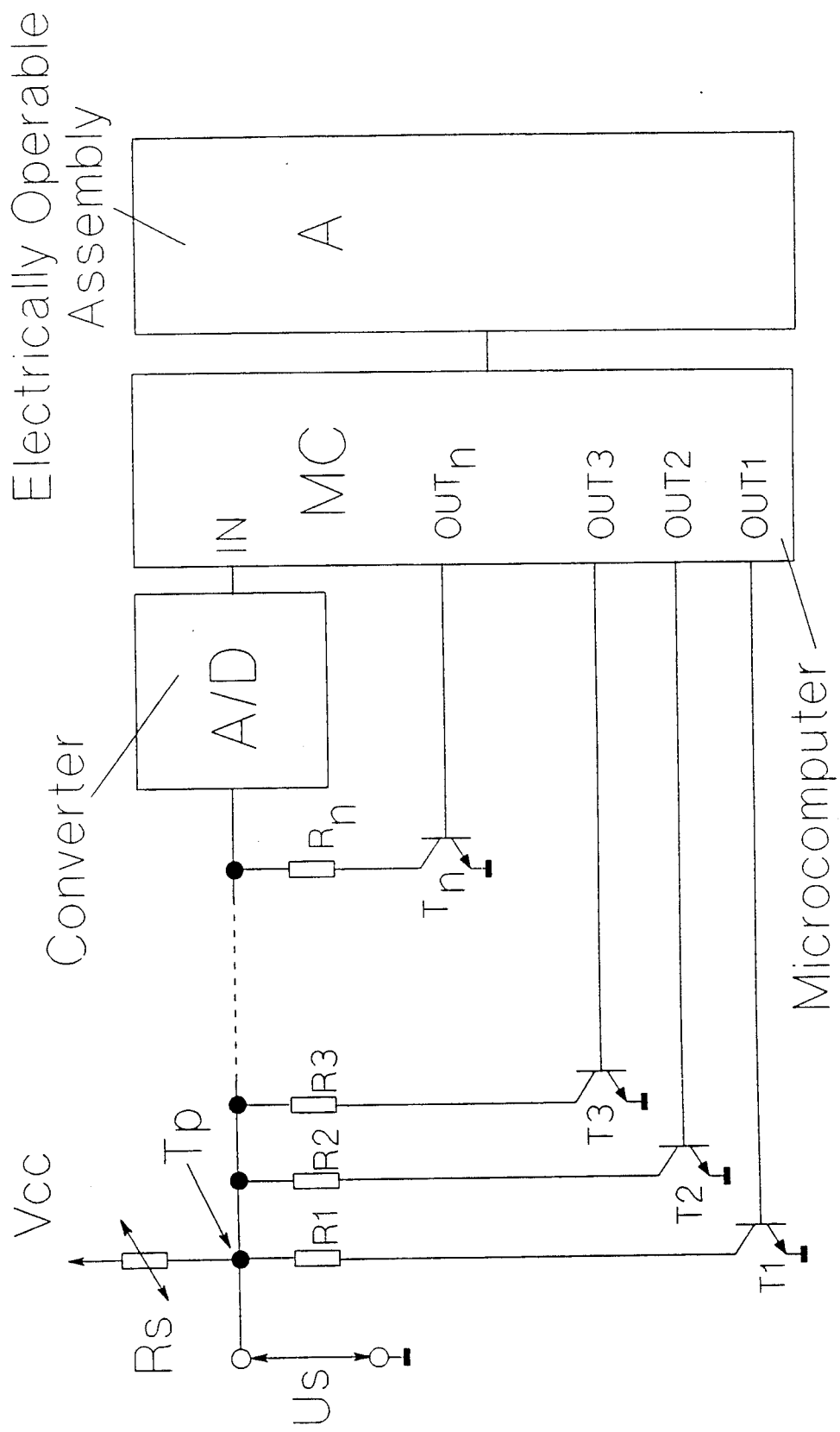
FIG. 1b is a circuit diagram of an alternate embodiment of the environmental sensor control system, including a multiplexer.
Figure 1B:
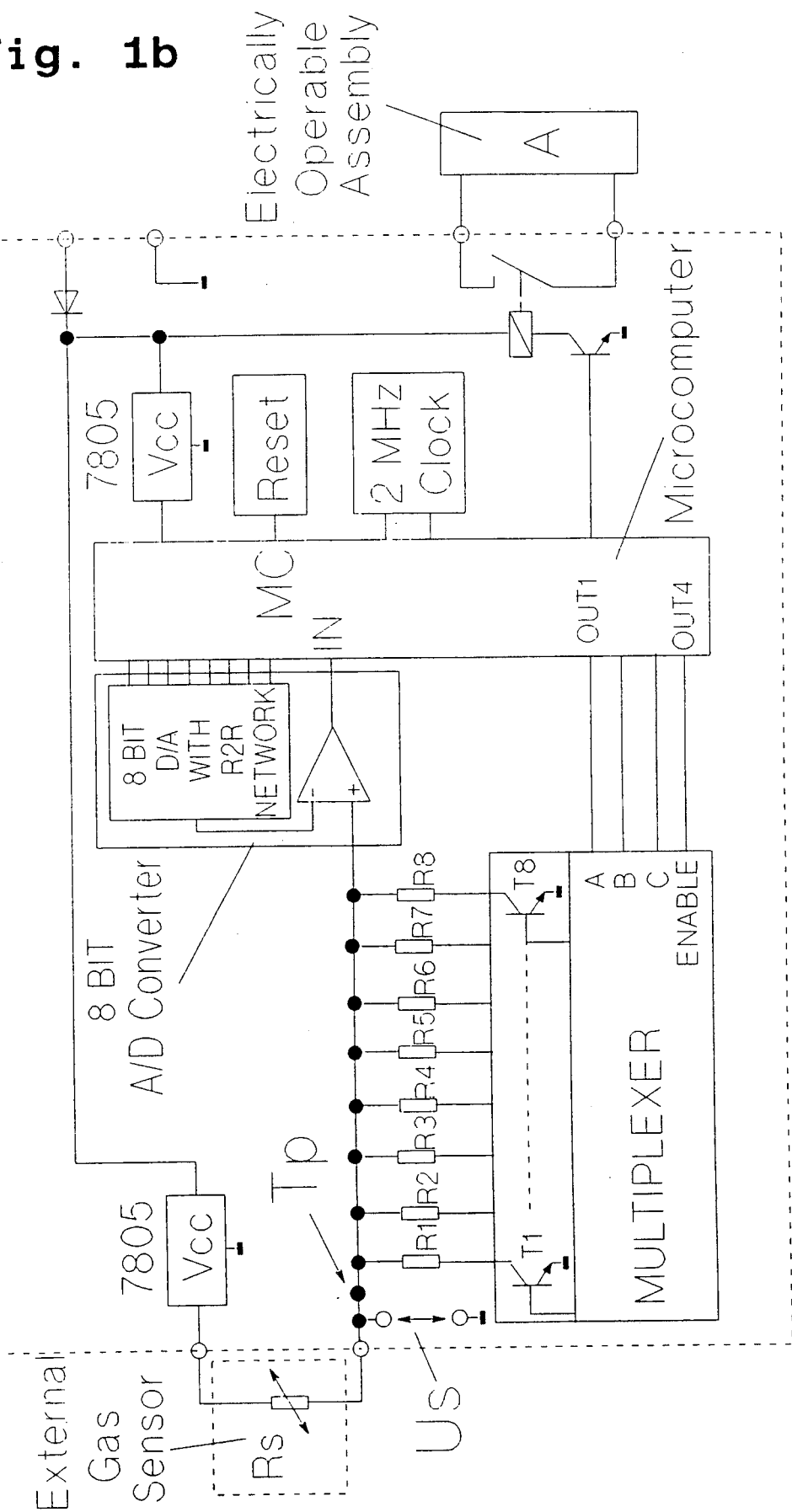

As can be seen from the drawing, the sensor device controls an electrically operable system A. The sensor device reacts to externally occurring pollutant peaks, particularly of a gaseous nature. The system A is primarily designed for control of electrically adjustable ventilation flaps present in motor vehicles. The sensor device comprises a microcomputer µC connected to the assembly A and to a sensor element (Rs). The microcomputer may be, for example, a National Semiconductors COP 324 C model. The sensor element (Rs), preferably manufactured of tin oxide (SnO2), is mounted at a location that has been previously established as satisfactory for the recording of gaseous pollutants, e.g. behind the radiator of a motor vehicle engine. The sensor element (Rs) is connected on one side to a stabilized supply voltage Vcc and on the other side to a resistor configuration Rl-Rn in the form of a voltage divider. At the divider point Tp of the voltage divider, which exhibits the sensor voltage Us, the microcomputer is connected to inputs IN1-INn represented on FIG. 1a by IN via an analog/digital converter A/D. In addition, the microcomputer µC is provided with outputs OUT1-OUTn, each of which being connected to a transistor T1-Tn, if desired by a multiplexer, e.g. Motorola 74 LS 138 for binary coded selection of the transistors. These transistors T1-Tn each have their emitters connected to ground and are each connected by their respective collectors to one of the differently rated resistors of resistor configuration R1-Rn which are connected in parallel. It is also possible to include the transistors in a multiplexer, e.g. Motorola 74 LS 156 as shown in FIG. 1b.

Because of this configuration it is possible, through selection of one or more resistors, to cover a broad resistance spectrum and thus attain a satisfactory compensation for the manufacturing deviations, the effect of aging and the resistance value of the cooperating sensor element Rs that changes with temperature and humidity.

The selection is done in such a way that, at the beginning, the sensor voltage Us is set to about half the voltage supply Vcc at divider point Tp.

Figure 3A:
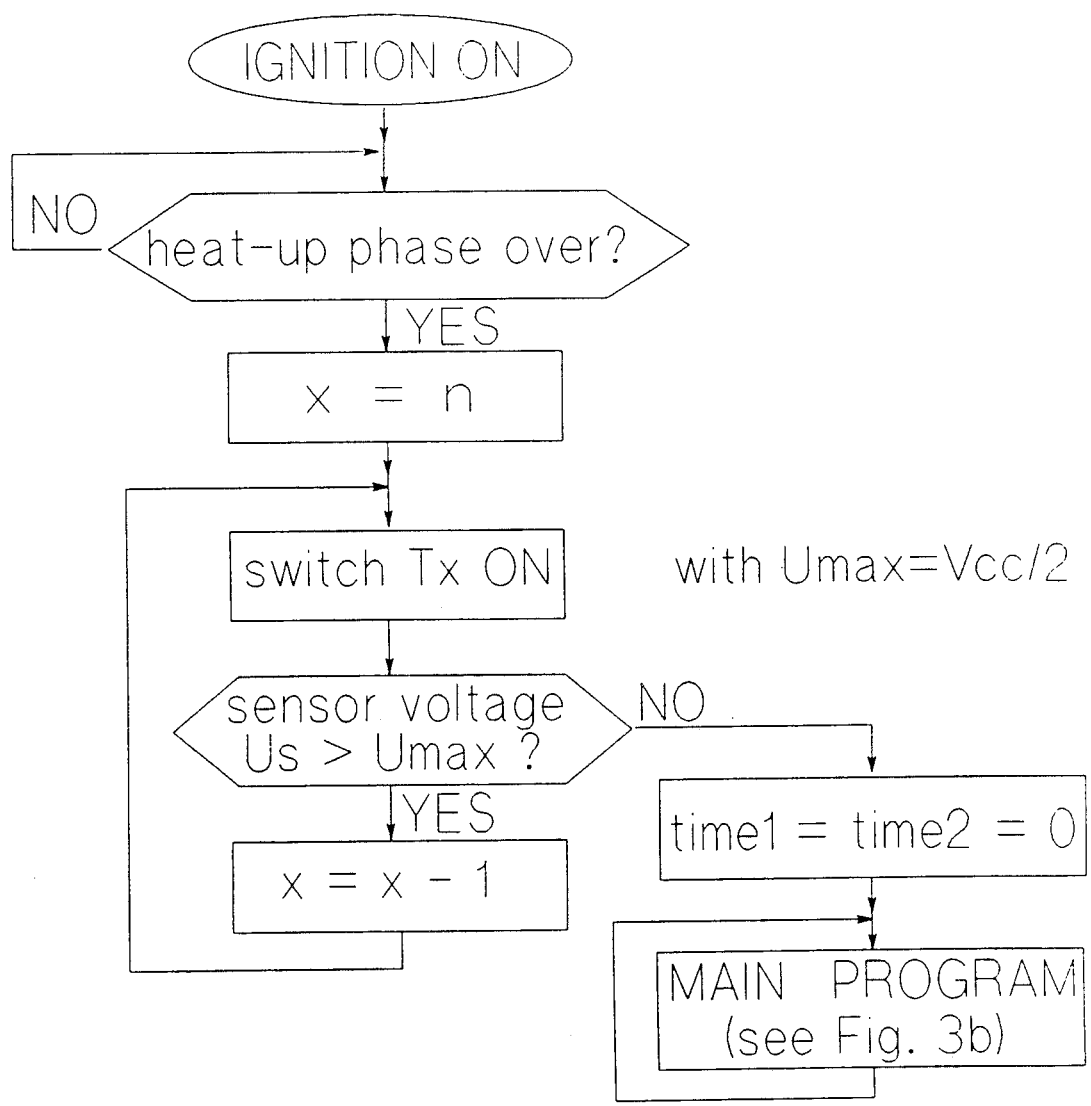
FIG. 3a is a flow chart depicting the initialization phase of the environmental sensor control system illustrating the logic flow followed after the heat up phase.
Figure 3B:
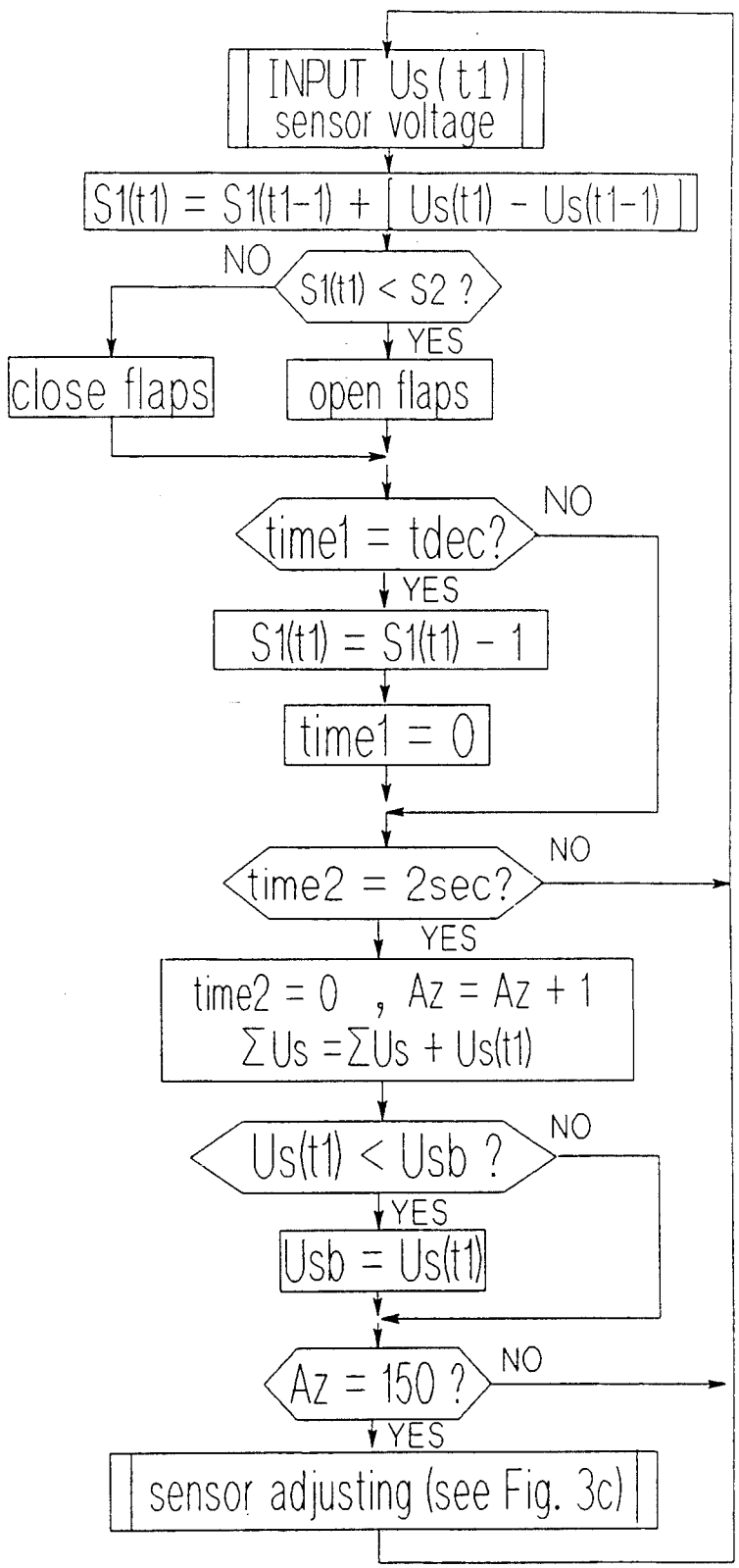
FIG. 3b is a flow chart indicating the method steps followed by the microcomputer.
Figure 3C:
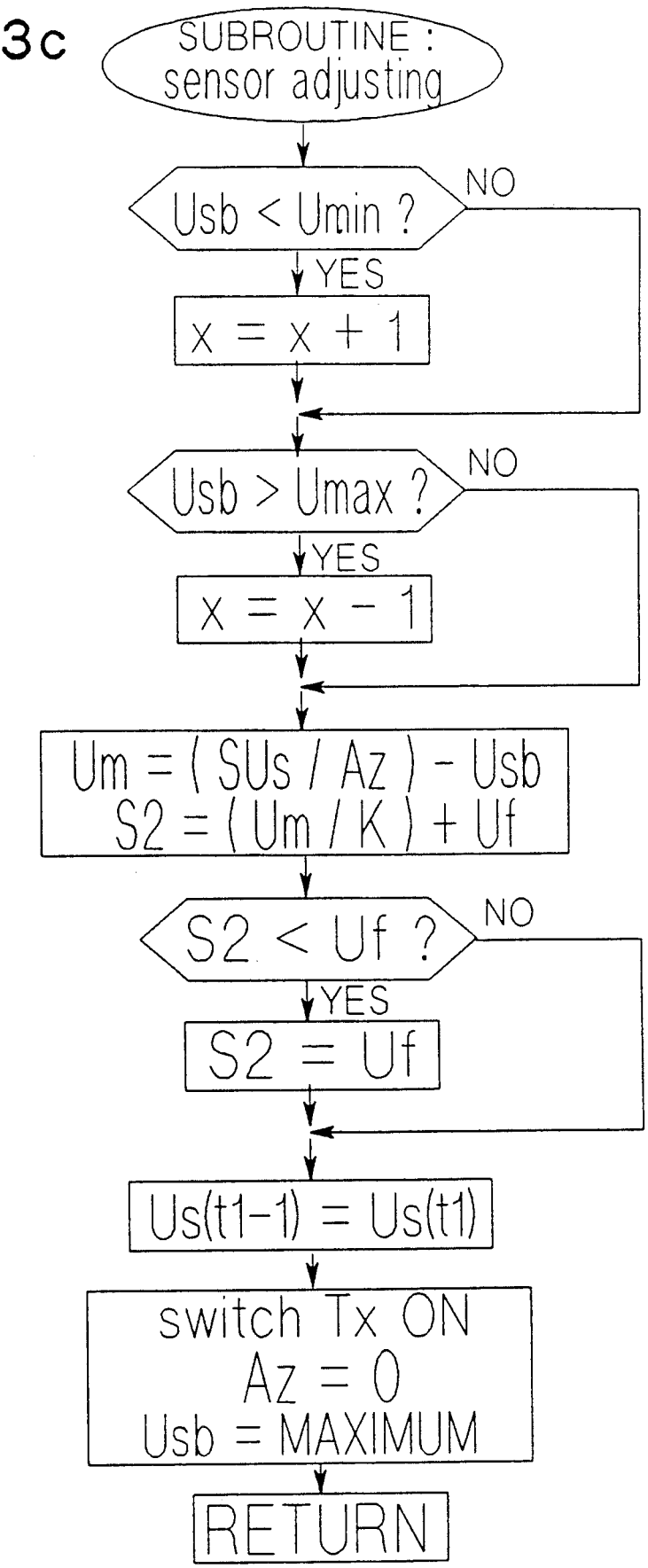
FIG. 3c is a flow chart illustrating the method steps followed in adjusting or compensating for various internal characteristics of the sensor.

During the initializing phase of the sensor device, (FIG. 3a) a resistance value created by at least one of resistors R1-Rn is connected to ground via transistors T1-Tn. Thus, it is possible to bring he sensor voltage Us, which fluctuates between a minimum value Us min and a maximum value Us max, to an optimum working point. This is achieved at a resistance value corresponding to the resistance value of sensor element Rs, i.e. half the supply voltage Vcc, whereby a certain pollutant quantity creates a maximum excursion of the sensor voltage. This procedure is carried out after the heat-up phase of the sensor device, which lasts about 1.5 minutes.

In continued operation, correction of the sensor voltage Us takes place. In order to achieve this, the sensor voltage Us supplied in digitized form via the A/D analog/digital converter is read into the microcomputer. Within a specified period of time INT of e.g. 5 minutes (measuring interval), the minimum sensor voltage Us min is determined. Us min is then compared to the voltage limit values U max and U min that are programmed in as fixed values and define the working range, whereby an acceptable correction is achieved, if U min≦Us min≦U max. A base voltage value Usb is derived from the minimum sensor voltage Us min determined during the measuring interval. This base voltage value Usb enters into the second signal value S2, which represents the changing operating point, as follows:

$$S2 = \left(\left[\left(\sum_{n=1}^{Az} Us\right)/Az - Usb\right]/K\right) + Uf$$

If S2 is equal to or smaller than Uf according to the above formula, then the Uf value is taken for S2.
In this formula:
Az = number of measurements during a measuring interval INT
K = constant factor
Uf = preset fixed voltage value By these means, the manufacturing deviations in the sensor base resistance, the temperature sensitivity and the aging effect are compensated for.

It is therefore not necessary that sensor element Rs and resistor configuration Rl-Rn be mounted adjacent to each other, which means that these components, along with the microcomputer, can be mounted in a more favorable location, e.g. in the interior of a vehicle.

Figure 2A:
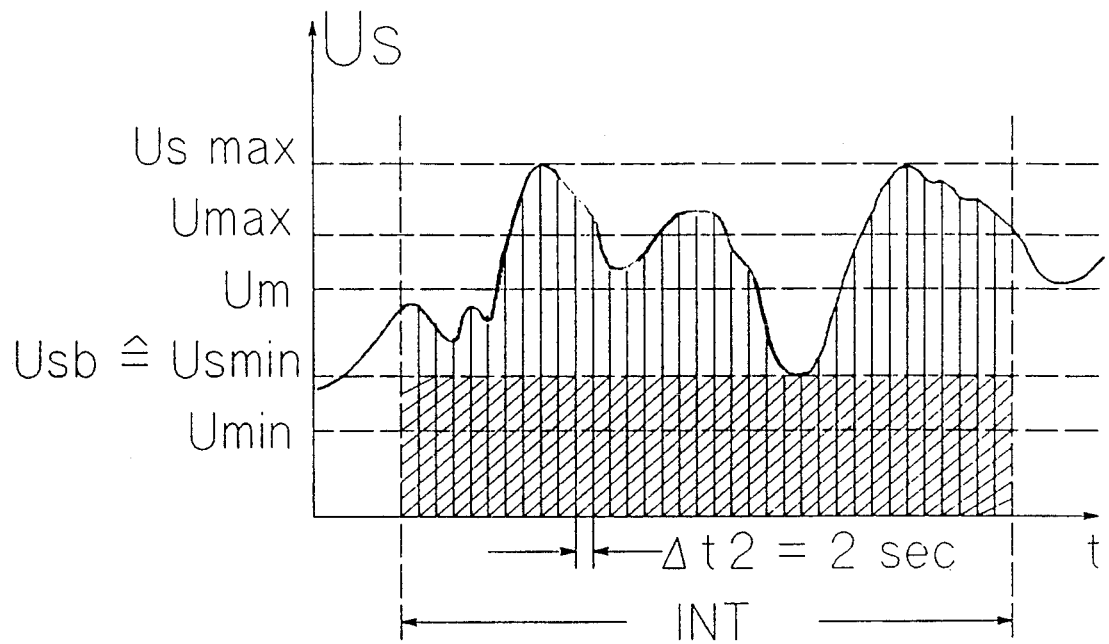
FIG. 2a is a corresponding voltage diagram

In order to adjust the sensor device to different sensitivities of the sensor element, the mean value Um of the changing voltage part of the sensor voltage Us is determined during measuring period INT (see FIG. 2a). This mean value Um is created by the addition of the values of the sensor voltage Us determined at specified time intervals Δt2 during the measuring interval INT and through division of the resulting total value by the number of measurements, as well as by subtraction of the voltage base value Usb derived from the minimum sensor voltage Us min from the average value described above. The mean value Um indicates the sensitivity of the individual sensor element Rs, that is, a sensitive sensor element having a high mean value. If a sensitive sensor element is detected by the microcomputer, the operating point of the circuit configuration represented as the second signal value S2 will be higher than with an insensitive sensor element.

For the first measuring period after the heat-up phase, only the fixed voltage value Uf is used as a switching criterion because the sensor element Rs has not yet reached its working temperature and thus is still relatively insensitive. In this measuring period, the sensitivity is then determined and the corrected operating point for the next measuring interval established.

The first internal computing value S1 required for the above operation is calculated as follows:

$$S1(t1) = S1(t1-1) + (Us(t1) - Us(t1-1))$$

The following definitions apply:
S1 (t1) = first actual signal value
S1 (t1−1) = first signal value of previous measurement
Us (t1) = actual sensor voltage value
Us (t1−1) = sensor voltage value of previous measurement.

If S1 is equal to or smaller than S2 then S1 is taken to be 0 in order to achieve an adaptation to an increasing base pollutant level.

Figure 2B:
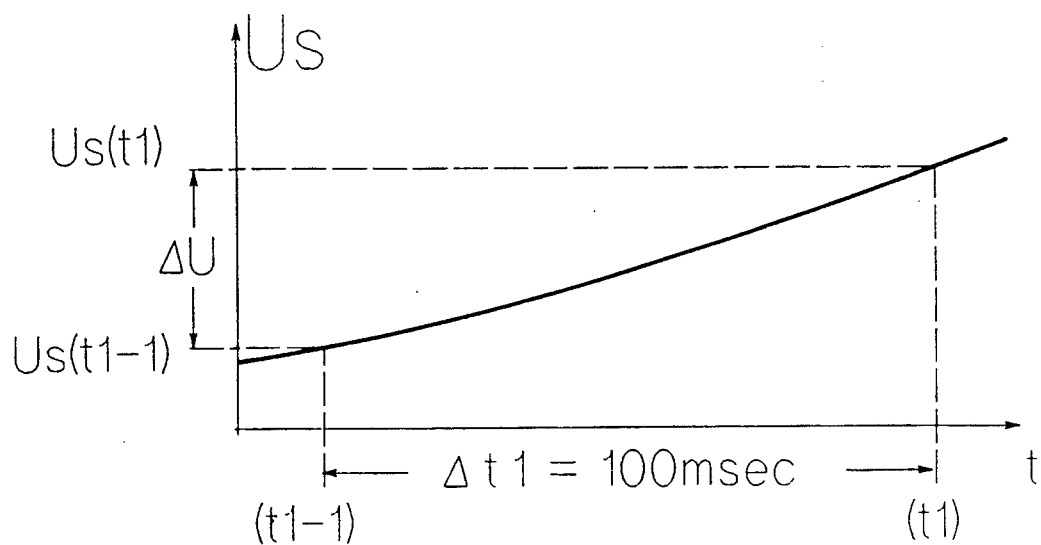
FIG. 2b is a segment of the voltage diagram

These measurements, required for determination of the first computing value S1 (see FIG. 2b), are taken at very much shorter time intervals Δt1, than the measurements necessary for the determination of the mean value Um of the changing voltage portion of the sensor voltage Us, which are taken at time intervals Δt2, i.e. Δt2 is approx 20 Δt1.

While controlling motor vehicle ventilation flaps, a problem can occur where a relatively high pollutant load in the immediate area, determined by sensor element Rs, initiates closing of the air flaps and causes the closure to be maintained over a longer period. Since current motor vehicles are relatively well sealed with regard to their interiors, a lack of air would occur after a length of time dependent on the number of passengers and the size of the interior, thereby causing danger to the passengers.

In order to prevent this, the duration of closure of the air flaps is made partially independent of the actual outside pollutant level, i.e. the first signal value S1 is decremented by a certain amount at specified time intervals, e.g. every 500 ms. In this way, it is assured that the air flaps generally do not remain closed over a long period of time.

If because of outside influences or system defects the previously mentioned process does not come into operation, the ventilation system is operated automatically for a specified period of time via a timer in the microcomputer.

What is claimed is:
1. An environmental sensor control system for controlling an electrically operable assembly, the sensor control system comprising:
a circuit that is connected
on one side electrically to the electrically operable assembly, and
on the other side to a voltage divider having resistors (R1-Rn), the voltage divider comprising
a sensor having a resistance (Rs), the sensor being adapted for the detection of external pollutants; and
the resistor configuration (R1-Rn) connected to the sensor, the circuit further including an operating point that changes in response to a signal supplied by the sensor, the sensor control system having a microcomputer ($\mu C$) that is connected on its input side to a divider point (Tp) of the voltage divider via an analog/digital converter (A/D) and on its output side to a number of switching elements (T1–Tn), each switching element cooperating with a different resistor (R1–Rn); and at least one of the resistors (R1–Rn) being connected between the sensor and ground via at least one of the switching elements;

whereby the resistors are switched according to commands generated by the microcomputer in response to signals from the sensor, such signals being dependent upon external pollutant levels and sensor characteristics.

2. An environmental sensor control system as in claim 1 wherein the resistor configuration is mounted at a location which is remote from the sensor.

3. An environmental sensor control system as in claim 1 wherein the microcomputer ($\mu C$) is connected on its output side to switching elements (T1–Tn) are switching transistors whose emitters are connected to ground and whose collectors are connected to the sensor (Rs) via their associated resistors (R1–Rn).

4. An environmental sensor control system as in claim 1 wherein the microcomputer ($\mu C$) is connected on its output side to a multiplexer which is connected on its output side to the switching elements (T1–Tn), the switching elements having emitters which are connected to ground and collectors which are connected to the sensor (Rs) via their associated resistors (R1–Rn).

5. An environmental sensor control system as in claim 1 wherein the microcomputer ($\mu C$) is connected on its output side to a multiplexer which on its output side has a number of outputs in the form of open collectors to which are connected the resistors (R1–Rn) and the sensor (Rs).

6. An environmental sensor control system as in claim 1 wherein one or more of the resistors (R1–Rn) cooperate with the sensor (Rs) and are activated within the circuit depending on sensor voltage (Us).

7. An environmental sensor control system as in claim 1 wherein the microcomputer ($\mu C$) converts a digitized sensor voltage Us supplied to it via inputs IN, which are connected to the analog/digital converter (A/D), into a first internal signal value (S1) and compares (S1) with a second internal signal value (S2) representing the changing operating point.

8. An environmental sensor control system as in claim 7 wherein the microcomputer ($\mu C$) is provided with means for creating the first signal value (S1) derived from the changes ($\Delta U$) of the sensor voltage (Us) occurring within a given time period ($\Delta t1$), and wherein the first signal creating means does not cause any change of the first signal value (S1) below a specified fixed value (Uf).

9. An environmental sensor control system as in claim 8 wherein the microcomputer ($\mu C$) is provided, for creation of the second signal value (S2), with means for addition of the specified fixed value (Uf) and of a mean value (Um) of the changing voltage portion of the sensor voltage (Us), and means for dividing by a constant factor.

10. An environmental sensor control system as in claim 9 wherein the changing mean value (Um) is created by means for addition of values of the sensor voltage (Us) determined at specified time intervals $\Delta t2$ over a specified period of time (INT) and division of the resulting total value by the number of measurements, and subtraction from the resulting average value of a base voltage value (Usb), derived from the minimum value (Us min) of the values of the sensor voltage (Us) determined at specified time intervals $\Delta t2$ over the specified time period (INT).

11. An environmental sensor control system as in claim 7 wherein the microcomputer ($\mu C$) diminishes the sensor voltage (Us) that changes the first signal value (S1) at specified time intervals.

12. An environmental sensor control system as in claim 1 wherein one or more of the resistors (R1–Rn) cooperate with the sensor (Rs) and are activated within the circuit depending on a sensor voltage (Us), and wherein the microcomputer ($\mu C$) converts a digitized sensor voltage Us supplied to it via inputs IN, which are connected to the analog/digital converter (A/D), into a first internal signal value (S1) and compares (S1) with a second internal signal value (S2) representing the changing operating point.

13. An environmental sensor control system as in claim 12 wherein the microcomputer ($\mu C$) is provided with means for creating the first signal value (S1) derived from the changes ($\Delta U$) of the sensor voltage (Us) occurring within a given time period ($\Delta t1$), and wherein the first signal creating means does not cause any change of the first signal value (S1) below a specified fixed value (Uf).

14. An environmental sensor control system as in claim 13 wherein the microcomputer ($\mu C$) is provided, for creation of the second signal value (S2) with means for addition of the specified fixed value (Uf) and of a mean value (Um) of the changing voltage share of the sensor voltage (Us), and means for dividing by a constant factor.

15. An environmental sensor control system as in claim 13 wherein the changing mean value (Um) is created by means for addition of values of the sensor voltage (Us) determined at specified time intervals $\Delta t2$ over a specified period of time (INT) and division of the resulting total value by the number of measurements, and subtraction from the resulting average value of a base voltage value (Usb), derived from the minimum value (Us min) of the values of the sensor voltage (Us) determined at specified time intervals $\Delta t2$ over the specified time period (INT).

16. An environmental sensor control system as in claim 12 wherein the microcomputer ($\mu C$) diminishes the sensor voltage (Us) that changes the first signal value (S1) at specified time intervals.

17. An environmental sensor control system as in claim 1 wherein the microcomputer ($\mu C$) converts a digitized sensor voltage Us supplied to it via inputs IN, which are connected to the analog/digital converter (A/D), into a first internal signal value (S1) and compares (S1) with a second internal signal value (S2) representing the changing operating point, and wherein the microcomputer ($\mu C$) is provided with means for creating the first signal value (S1) derived from the changes ($\Delta U$) of the sensor voltage (Us) occurring within a given time period ($\Delta t1$), and wherein the first signal creating means does not cause any change of the first signal value (S1) below a specified fixed value (Uf).

18. An environmental sensor control system as in claim 17 wherein the microcomputer ($\mu C$) is provided, for creation of the second signal value (S2), with means for addition of the specified fixed value (Uf) and of a mean value (Um) of the changing voltage portion of the sensor voltage (Us), and means for dividing by a constant factor.

19. An environmental sensor control system as in claim 17 wherein the changing mean value (Um) is created by means for addition of values of the sensor voltage (Us) determined at specified time intervals $\Delta t2$ over a specified period of time (INT) and division of the resulting total value by the number of measurements, and subtraction from the resulting average value of a base voltage value (Usb), derived from the minimum value (Us min) of the values of the sensor voltage (Us) determined at specified time intervals $\Delta t2$ over the specified time period (INT).

20. An environmental sensor control system as in claim 17 wherein the microcomputer ($\mu C$) diminishes the sensor voltage (Us) that changes the first signal value (S1) at specified time intervals.

* * * * *